UNITED STATES PATENT OFFICE.

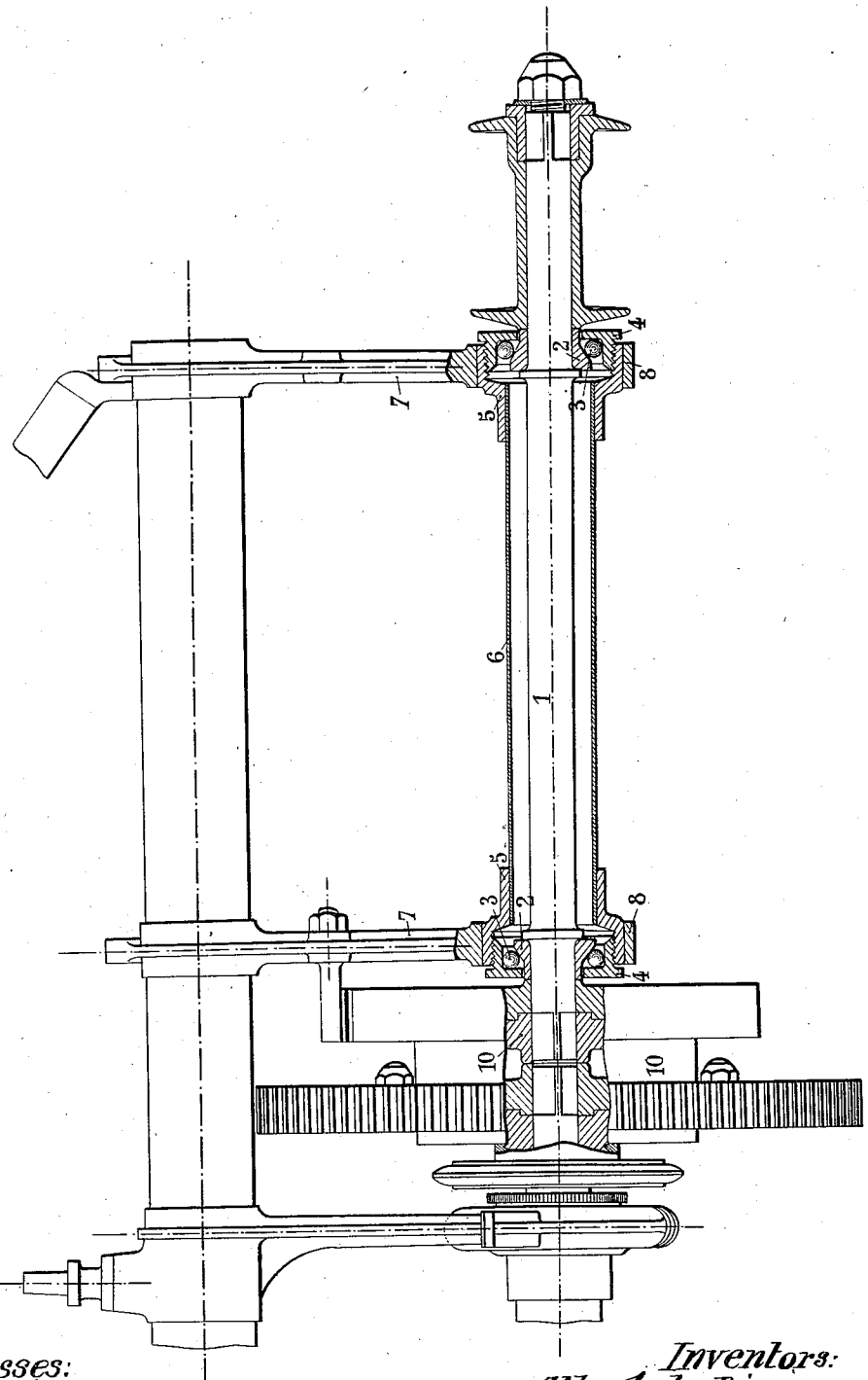

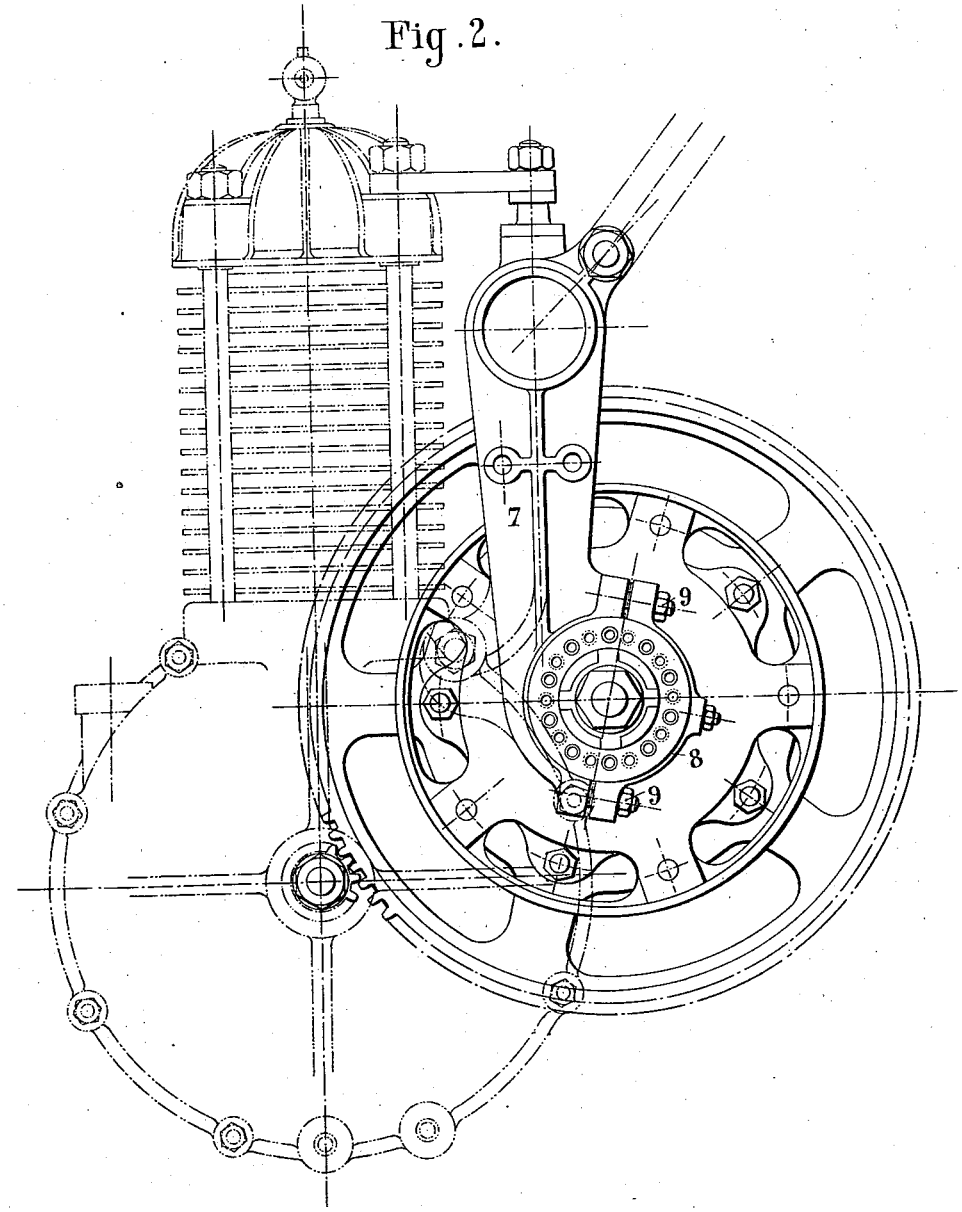

ALBERT DE DION AND GEORGES BOUTON, OF PUTEAUX, FRANCE.

MOTOR-VEHICLE.

SPECIFICATION forming part of Letters Patent No. 617,984, dated January 17, 1899.

Application filed August 3, 1898. Serial No. 687,655. (No model.)

*To all whom it may concern:*

Be it known that we, ALBERT DE DION and GEORGES BOUTON, citizens of France, residing at Puteaux, France, have invented certain new and useful Improvements in Motor-Vehicles, of which the following is a specification.

This invention relates to a mode of securing the motor-axle to the frame of a motor-cycle or of a motor-carriage, particularly applicable to motor-tricycles, and allowing the taking to pieces of the part of the axle on the right, together with its wheel, or that on the left without taking the motor to pieces, and especially without interfering with the adjustment of the ball-bearings, which form a part of or are carried by the axle; and in order that the invention may be readily understood we will describe the same fully and will explain the working thereof, reference being had to the annexed drawings, in which—

Figure 1 is a vertical axial section of one part or half of the motor-axle, and Fig. 2 is an end view of the same.

The arrangement is the same for both halves of the motor-axle, which are connected by differential gear.

The half-axle 1 carries near its two ends two cones 2 2, on which roll the balls 3 3, held in place by the caps 4 4. These caps 4 4 screw into sockets 5 5, fixed on the tube 6, surrounding the axle 1, thus permitting the ball-bearing to be adjusted very exactly and independently of the rest of the mechanism. The frame of the vehicle is supported upon these sockets 5 5 by means of two arms 7 7, which are secured in place by half collars or clips 8 8, tightened up by nuts 9 9.

To take out the half-axle 1 of the vehicle, it is thus only necessary to remove the two half collars or clips 8 8, then to push the axle 1 a little to the outside, so as to disengage it from the differential gear 10, and finally to draw it forward to separate it from the arms 7 7. The putting together is effected by operating in the reverse manner.

Having thus described our invention, we claim—

In motor-vehicles, means for securing each of the halves of the motor-axle to the frame of the vehicle, the said means consisting of cones on each of the halves near their extremities, a tube surrounding the axle and having sockets, clips supporting said tube, balls disposed to roll upon said cones, and caps screwed into said sockets and holding the balls in place, substantially as described.

In testimony whereof we have hereunto set our hands in presence of two subscribing witnesses.

ALBERT DE DION.
GEORGES BOUTON.

Witnesses:
ALFRED FREU,
EDWARD P. MACLEAN.